(12) United States Patent
Huang et al.

(10) Patent No.: US 12,514,801 B2
(45) Date of Patent: Jan. 6, 2026

(54) ANHYDROUS COMPOSITION FOR CARING FOR KERATIN MATERIALS

(71) Applicant: L'OREAL, Paris (FR)

(72) Inventors: Yu Huang, Shanghai (CN); Quan Sun, Shanghai (CN); Le Sheng, Shanghai (CN)

(73) Assignee: L'OREAL, Paris (FR)

( * ) Notice: Subject to any disclaimer, the term of this patent is extended or adjusted under 35 U.S.C. 154(b) by 772 days.

(21) Appl. No.: 17/787,541

(22) PCT Filed: Dec. 30, 2019

(86) PCT No.: PCT/CN2019/129885
§ 371 (c)(1),
(2) Date: Jun. 20, 2022

(87) PCT Pub. No.: WO2021/134194
PCT Pub. Date: Jul. 8, 2021

(65) Prior Publication Data
US 2022/0387278 A1 Dec. 8, 2022

(51) Int. Cl.
| | | |
|---|---|---|
| A61K 8/365 | (2006.01) | |
| A61K 8/04 | (2006.01) | |
| A61K 8/25 | (2006.01) | |
| A61K 8/34 | (2006.01) | |
| A61Q 19/00 | (2006.01) | |

(52) U.S. Cl.
CPC .............. *A61K 8/365* (2013.01); *A61K 8/042* (2013.01); *A61K 8/25* (2013.01); *A61K 8/345* (2013.01); *A61Q 19/00* (2013.01); *A61K 2800/31* (2013.01); *A61K 2800/48* (2013.01)

(58) Field of Classification Search
CPC .......... A61K 8/365; A61K 8/042; A61K 8/25; A61K 8/345; A61K 2800/31; A61K 2800/48; A61K 2800/52; A61K 8/8158; A61K 8/361; A61Q 19/00
See application file for complete search history.

(56) References Cited

U.S. PATENT DOCUMENTS

| | | | | |
|---|---|---|---|---|
| 5,824,326 A | * | 10/1998 | Crotty | A61K 8/86 |
| | | | | 424/59 |
| 6,632,444 B1 | * | 10/2003 | Zhou | A61Q 19/02 |
| | | | | 514/567 |
| 9,000,049 B2 | | 4/2015 | Manissier et al. | |
| 2011/0281941 A1 | | 11/2011 | Manissier et al. | |

FOREIGN PATENT DOCUMENTS

| | | | | |
|---|---|---|---|---|
| CN | 102307563 A | | 1/2012 | |
| CN | 107822909 A | * | 3/2018 | A61K 8/06 |
| FR | 2 932 679 A1 | | 12/2009 | |
| FR | 2 932 679 B1 | | 8/2010 | |
| FR | 2 979 821 B1 | | 10/2013 | |
| FR | 3 001 140 A1 | | 7/2014 | |
| WO | WO 2007/101357 A2 | | 9/2007 | |

OTHER PUBLICATIONS

International Search Report & Written Opinion issued Sep. 25, 2020 in PCT/CN2019/129885, filed on Dec. 30, 2019, 9 pages.
Chinese Office Action and issued Jun. 1, 2023 in Chinese Patent Application No. 201980103386.X, 5 pages.
Combined Chinese Office Action and Search Report issued Jan. 10, 2024 in Chinese Patent Application No. 201980103386.X, 8 pages.
Extended European Search Report issued Sep. 11, 2023 in European Patent Application 19958142.2, 7 pages.

* cited by examiner

*Primary Examiner* — Deborah D Carr
(74) *Attorney, Agent, or Firm* — Oblon, McClelland, Maier & Neustadt, L.L.P.

(57) ABSTRACT

An anhydrous composition for caring for keratin materials comprises: a) from 0.5 wt. % to 3.0 wt. % of ferulic acid, relative to the total weight of the composition; and b) at least one $C_3$-$C_{10}$ polyol; and c) at least one silica aerogel. A cosmetic process for caring for keratin materials comprises applying the anhydrous composition according to the keratin materials.

14 Claims, No Drawings

ANHYDROUS COMPOSITION FOR CARING FOR KERATIN MATERIALS

TECHNICAL FIELD

The present invention relates to a cosmetic composition for caring for keratin materials. In particular, the present invention relates to an anhydrous composition for caring for keratin materials. The present invention also relates to a process for caring for keratin materials.

BACKGROUND

Ferulic acid is a robust antioxidant active agent which could provide whitening/lightening, anti-finelines, anti-inflammation and UV protection benefits.

However, ferulic acid has odor issue when contacting with aqua/water after several days, for example 7 days when the content of ferulic acid is no less than 1.9 wt. %, 15 days when the content of ferulic acid is no less than 1.5 wt. %, and 30 days when the content of ferulic acid is no less than 1.0 wt. %, relative to the total weight of the composition containing it.

Current exiting products focus on water-free cosmetic base to avoid contacting with water. These products deliver oily/greasy sensory and heating sensation (cue for skin irritation) which limits the application of ferulic acid in skin care field.

Many commercialized products contain ferulic acid in a low amount. And many commercialized product is so thin that it is very easy for them to flow, and it is inconvenient for them to be applied by the consumers.

It is desired that the product has a suitable viscosity so that it is convenient for the consumers to use it.

There is no report on a product containing ferulic acid in a higher amount and remaining stable over time, meanwhile having a suitable viscosity for the consumers using it conveniently.

SUMMARY OF THE INVENTION

One object of the present invention is thus to provide a composition for caring for keratin materials, which contains ferulic acid in a higher amount, remains stable over time and has a suitable viscosity for the consumers using it conveniently.

Another object of the present invention is to provide a composition for caring for keratin materials, which contains ferulic acid in a higher amount and gives no discomfort feeling such as greasy and sticky.

Still another object of the present invention is to provide a cosmetic process for caring for keratin materials.

Thus, according to a first aspect, the present invention provides an anhydrous composition for caring for keratin materials comprising:
  a) from 0.5 wt. % to 3.0 wt. % of ferulic acid, relative to the total weight of the composition;
  b) at least one $C_3$-$C_{10}$ polyol; and
  c) at least one silica aerogel.

According to a second aspect, the present invention provides a cosmetic process for caring for keratin materials, comprising applying the anhydrous composition according to the present invention to the keratin materials.

Surprisingly, the inventors have found that ferulic acid can dissolve in the $C_3$-$C_{10}$ polyol in a higher content, and the composition according to the present invention is stable over time and has a suitable viscosity so that it is convenient for the consumers to use it.

In addition, the composition according to the present invention delivers good skin feeling (no oily/greasy sensory and/or heating sensation).

Other advantages of the present invention will emerge more clearly on reading the description and the examples that follow.

DETAILED DESCRIPTION OF THE INVENTION

According to the first aspect, the present invention provides an anhydrous composition for caring for keratin materials comprising:
  a) from 0.5 wt. % to 3.0 wt. % of ferulic acid, relative to the total weight of the composition;
  b) at least one $C_3$-$C_{10}$ polyol; and
  c) at least one silica aerogel.

In that which follows and unless otherwise indicated, the limits of a range of values are included within this range, in particular in the expressions "between . . . and" and "from . . . to . . . ".

For the purposes of the present invention, the term "keratin materials" are intended to cover human skin, mucous membranes such as the lips. Human skin, in particular face and neck, are most particularly considered according to the present invention.

Moreover, the expression "at least one" used in the present description is equivalent to the expression "one or more".

Throughout the instant application, the term "comprising" is to be interpreted as encompassing all specifically mentioned features as well optional, additional, unspecified ones.

As used herein, the use of the term "comprising" also discloses the embodiment wherein no features other than the specifically mentioned features are present (i.e. "consisting of").

For the purpose of the present invention, "stable" refers to a composition which, after having been placed at 45° C., 37° C., room temperature and 4° C. for at least two months, does not exhibit perceptible change in appearance.

By "anhydrous", it means that no water is added on purpose and the water content is less than 0.1 wt. % of the anhydrous composition, in particular, there is no water in the anhydrous composition.

Unless otherwise defined, all technical and scientific terms used herein have the same meaning as commonly understood by those skilled in the art the present invention belongs to. When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about". Accordingly, unless indicated to the contrary, the numerical values and parameters described herein are approximate values which are capable of being changed according to the desired purpose as required.

Ferulic Acid

According to the first aspect, the anhydrous composition of the present invention comprises ferulic acid.

Ferulic acid, CAS number of which is 1135-24-6, is also called 4-Hydroxy-3-methoxycinnamic acid, which has the following formula:

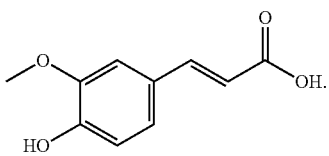

Like many natural phenols, it is a strong antioxidant that is very reactive toward free radicals and reduces oxidative stress. Many studies suggest that ferulic acid may have antitumor activity.

Ferulic acid can be obtained through chemical synthesis and extraction.

For example, ferulic acid can be obtained by dissolving the vanillin, malonic acid and piperidine in pyridine for reaction of three weeks, followed by precipitation with hydrochloric acid.

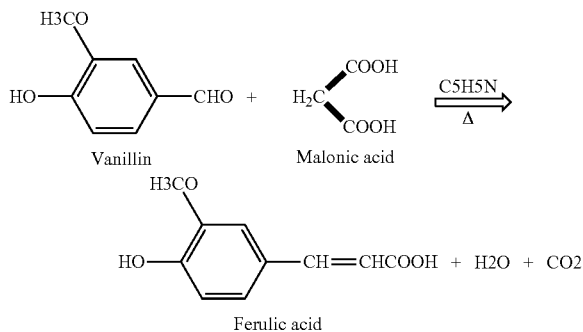

There are three different natural sources for ferulic acid. It can be produced from low-molecular-weight ferulic conjugates. For example, ferulic acid has been isolated from the waste material of rice bran oil production by hydrolyzing with sodium hydroxide or potassium hydroxide at 90-100° C. Another possibility is a direct extraction of ferulic acid from plant cell walls by using feruloyl esterases. Various microorganisms are able to secrete feruloyl esterases (e.g. *A. niger, Bacillus* species and *Clostridium thermocellum*). The enzymatic hydrolysis of sugar-beet pulp has been analyzed using a mixture of carbohydrases from *Aspergillus aculeatus* with a final ferulic acid concentration of 200 mg/L in the hydrolysate. Moreover, a purification method to isolate ferulic acid from sugar-beet pulp after enzymatic hydrolysis using a fixed-bed adsorption with activated carbon has been developed. With this process, a purity of 50% has been achieved. Finally, ferulic acid could be produced by cell culture fermentations, for example, free ferulic acid (up to 50 mg/L) and also conjugated to anthocyanins (up to 150 mg/L) has been accumulated in cell cultures of *Ajuga pyramidalis*.

As products containing ferulic acid, mention may be made of ORYZA FERULIX from ORYZA OIL & FAT CHEMICAL.

Advantageously, the composition of the present invention comprises from 0.8 wt. % to 2.5 wt. %, preferably from 1.0 wt. % to 2.0 wt. % of ferulic acid, relative to the total weight of the composition.

$C_3$-$C_{10}$ Polyol

According to the first aspect, the anhydrous composition of the present invention comprises at least one $C_3$-$C_{10}$ polyol.

The $C_3$-$C_{10}$ polyol can be used as a solvent and to deliver good skin feeling (no oily/greasy sensory and/or heating sensation).

It was found that ferulic acid can dissolve in the $C_3$-$C_{10}$ polyol in a higher content of from 0.5 wt. % to 3.0 wt. %, relative to the total weight of the composition.

Preferably, the polyol has 3-6 carbon atoms, i.e, being $C_3$-$C_6$ polyol.

In the present application, polyols mainly include glycols and triols.

Preferably, the polyol is selected from $C_3$-$C_6$ glycol or triol.

Thus, in some preferred embodiments, the anhydrous composition of the present invention comprises at least one $C_3$-$C_6$ glycol or triol.

As examples of $C_3$-$C_6$ glycols or triols that can be used in the composition of the present invention, mention can be made to propylene glycol, butylene glycol, pentylene glycol, hexylene glycol, dipropylene glycol and gercerin.

In the present invention, the definition of glycols and triols includes all possible isomer. For example, propylene glycol includes 1,3-propylene glycol, 1,2-propylene glycol and 1,1-propylene glycol. Butylene glycol includes 1,4-butylene glycol, 1,3-butylene glycol, 1,2-butylene glycol, etc.

In a preferred embodiment, the anhydrous composition comprises at least $C_3$-$C_6$ polyol selected from dipropylene glycol, propylene glycol, butylene glycol and glycerin.

Advantageously, the anhydrous composition of the present invention comprises from 95 wt. % to 99 wt. %, preferably from 96 wt. % to 98 wt. % of at least one $C_3$-$C_{10}$ polyol, relative to the total weight of the composition.

In an embodiment, the anhydrous composition of the present invention comprises from 30 wt. % to 50 wt. % of dipropylene glycol, relative to the total weight of the composition.

In an embodiment, the anhydrous composition of the present invention comprises from 90 wt. % to 99 wt. %, preferably from 91 wt. % to 98 wt. % of at least one $C_3$-$C_6$ glycol or triol, relative to the total weight of the composition, wherein dipropylene glycol presents from at least 40 wt. % of the total weight of the corn position.

Preferably, the anhydrous composition of the present invention comprises no oil.

Silica Aerogel

According to the first aspect, the anhydrous composition of the present invention comprises at least one silica aerogel.

It was found by the inventors that with the existence of silica aerogel, the composition is stable at 45° C., 37° C., room temperature and 4° C. for at least two months.

Silica aerogels are porous materials obtained by replacing (by drying) the liquid component of a silica gel with air.

They can be synthesized via a sol-gel process in liquid medium and then dried, usually by extraction of a supercritical fluid; the one most commonly used being supercritical $CO_2$. This type of drying makes it possible to avoid shrinkage of the pores and of the material. The sol-gel process and the various drying processes are described in detail in Brinker CJ., and Scherer G. W., Sol-Gel Science: New York: Academic Press, 1990.

Preferably, the silica aerogel used in the present invention has a specific surface area per unit of mass ($S_M$) ranging from 500 to 1500 m²/g, preferably from 600 to 1200 m²/g and better still from 600 to 800 m²/g, and a size expressed as the mean volume diameter (D [0.5]), ranging from 1 to 30 µm, preferably from 5 to 25 µm, better still from 5 to 20 µm and even better still from 5 to 15 µm.

The specific surface area per unit of mass may be determined via the BET (Brunauer-Emmett-Teller) nitrogen absorption method described in the Journal of the American Chemical Society, vol. 60, page 309, February 1938 and corresponding to the international standard ISO 5794/1 (appendix D). The BET specific surface area corresponds to the total specific surface area of the materials under consideration.

The size of the silica aerogel may be measured by static light scattering using a commercial granulometer such as the MasterSizer 2000 machine from Malvern. The data are processed on the basis of the Mie scattering theory. This theory, which is exact for isotropic particles, makes it possible to determine, in the case of non-spherical particles, an "effective" particle diameter. This theory is especially described in the publication by Van de Hulst, H. C., "Light Scattering by Small Particles," Chapters 9 and 10, Wiley, New York, 1957.

According to one advantageous embodiment, the silica aerogel particles used in the present invention have a specific surface area per unit of mass ($S_M$) ranging from 600 to 800 $m^2$/g and a size expressed as the mean volume diameter (D[0.5]) ranging from 5 to 20 µm and better still from 5 to 15 µm.

The silica aerogel used in the present invention may advantageously have a tamped density r) ranging from 0.04 g/$cm^3$ to 0.10 g/$cm^3$ and preferably from 0.05 g/$cm^3$ to 0.08 g/$cm^3$.

In the context of the present invention, this density, known as the tamped density, may be assessed according to the following protocol:

40 g of powder are poured into a measuring cylinder; the measuring cylinder is then placed on a Stay 2003 machine from Stampf Volumeter; the measuring cylinder is then subjected to a series of 2500 packing motions (this operation is repeated until the difference in volume between two consecutive tests is less than 2%); the final volume Vf of packed powder is then measured directly on the measuring cylinder. The tamped density is determined by the ratio m/Vf, in this instance 40/Vf (Vf being expressed in $cm^3$ and m in g).

According to one embodiment, the silica aerogel used in the present invention have a specific surface area per unit of volume $S_V$ ranging from 5 to 60 $m^2$/$cm^3$, preferably from 10 to 50 $m^2$/$cm^3$ and better still from 15 to 40 $m^2$/$cm^3$.

The specific surface area per unit of volume is given by the relationship:

$$S_V = S_M \times \beta,$$

where ρ is the tapped density, expressed in g/$cm^3$, and $S_M$ is the specific surface area per unit of weight, expressed in $m^2$/g, as defined above.

Preferably, the silica aerogel according to the invention has an oil-absorbing capacity, measured at the wet point, ranging from 5 to 18 ml/g, preferably from 6 to 15 ml/g and better still from 8 to 12 ml/g.

The oil-absorbing capacity measured at the wet point, noted Wp, corresponds to the amount of water that needs to be added to 100 g of particle in order to obtain a homogeneous paste.

It is measured according to the wet point method or the method for determining the oil uptake of a powder described in standard NF T 30-022. It corresponds to the amount of oil adsorbed onto the available surface of the powder and/or absorbed by the powder by measuring the wet point, described below:

An amount=2 g of powder is placed on a glass plate, and the oil (isononyl isononanoate) is then added dropwisely. After addition of 4 to 5 drops of oil to the powder, mixing is performed using a spatula, and addition of oil is continued until a conglomerate of oil and powder has formed. At this point, the oil is added one drop at a time and the mixture is then triturated with the spatula. The addition of oil is stopped when a firm, smooth paste is obtained. This paste must be able to be spread on the glass plate without cracking or forming lumps. The volume Vs (expressed in ml) of oil used is then noted.

The oil uptake corresponds to the ratio Vs/m.

In some embodiments, the aerogel used according to the present invention is hydrophobic silica aerogel, preferably of silylated silica (INCI name: silica silylate).

The term "hydrophobic silica" means any silica whose surface is treated with silylating agents, for example halogenated silanes such as alkylchlorosilanes, siloxanes, in particular dimethylsiloxanes such as hexamethyldisiloxane, or silazanes, so as to functionalize the OH groups with silyl groups Si—Rn, for example trimethylsilyl groups.

As regards the preparation of hydrophobic silica aerogels that have been surface-modified by silylation, reference may be made to document U.S. Pat. No. 7,470,725.

Use will be made in particular of hydrophobic silica aerogels surface-modified with trimethylsilyl groups.

As silica aerogels that may be used in the invention, examples that may be mentioned include the aerogel sold under the name VM-2260 (INCI name: Silica silylate), by the company Dow Corning, the particles of which have a mean size of about 1000 microns and a specific surface area per unit of mass ranging from 600 to 800 $m^2$/g.

Mention may also be made of the aerogels sold by the company Cabot under the references Aerogel TLD 201, Aerogel OGD 201 and Aerogel TLD 203, Enova Aerogel MT 1100 and Enova Aerogel MT 1200.

Use will be made more particularly of the aerogel sold under the name VM-2270 (INCI name: Silica silylate), by the company Dow Corning, the particles of which have a mean size ranging from 5-15 microns and a specific surface area per unit of mass ranging from 600 to 800 $m^2$/g.

Advantageously, the composition of the present invention comprises from 0.1 wt. % to 8.0 wt. %, preferably from 0.2 wt. % to 6 wt. % of silica aerogel, relative to the total weight of the composition.

Hydrophilic Acrylic Polymer

According to the first aspect, the anhydrous composition of the present invention may further comprise at least one hydrophilic acrylic thickener.

The hydrophilic acrylic polymer can function as a thickener.

According to the present invention, the term "hydrophilic acrylic polymers" means non-hydrophobic and non-amphiphilic acrylic polymers.

Said hydrophilic acrylic polymers according to the present invention are polyacrylamidomethylpropanesulfonic acid (AMPS) acrylic polymers.

Among the hydrophilic acrylic polymers that may be mentioned are the following polymers.

1) Acrylic Polymers Comprising at Least One Monomer Bearing a Sulfonic Group

According to an embodiment, the hydrophilic acrylic polymer used according to the present invention comprises at least one monomer bearing a sulfonic group.

The polymers can be used in accordance with the present invention are homopolymers that may be obtained from at least one ethylenically unsaturated monomer bearing a sulfonic group, which may be in free form or partially or totally neutralized form.

Preferentially, the polymers are partially or totally neutralized with a mineral base (sodium hydroxide, potassium hydroxide or aqueous ammonia) or an organic base such as monoethanolamine, diethanolamine, triethanolamine, an aminomethylpropanediol, N-methylglucamine, basic amino acids, for instance arginine and lysine, and mixtures of these compounds. They are generally neutralized.

In the present invention, the term "neutralized" means polymers that are totally or virtually totally neutralized, i.e. at least 90% neutralized.

These polymers according to the present invention may be crosslinked or noncrosslinked.

The monomers bearing a sulfonic group of the polymer used in the composition of the present invention are especially chosen from vinylsulfonic acid, styrenesulfonic acid, (meth)acrylamido($C_1$-$C_{22}$)alkylsulfonic acids, N—($C_1$-$C_{22}$) alkyl(meth)acrylamido($C_1$-$C_{22}$)alkylsulfonic acids such as undecylacrylamidomethanesulfonic acid, and also partially or totally neutralized forms thereof, and mixtures thereof.

According to one preferred embodiment of the present invention, the monomers bearing a sulfonic group are chosen from (meth)acrylamido($C_1$-$C_{22}$)alkylsulfonic acids, for instance acrylamidomethanesulfonic acid, acrylamidoethanesulfonic acid, acrylamidopropanesulfonic acid, 2-acrylamido-2-methylpropanesulfonic acid, 2-methacrylamido-2-methylpropanesulfonic acid, 2-acrylamido-n-butanesulfonic acid, 2-acrylamido-2,4,4-trimethylpentanesulfonic acid, 2-methacrylamidododecylsulfonic acid and 2-acrylamido-2,6-dimethyl-3-heptanesulfonic acid, and also partially or totally neutralized forms thereof, and mixtures thereof.

More particularly, 2-acrylamido-2-methylpropanesulfonic acid (AMPS), and also partially or totally neutralized forms thereof, are used.

When the polymers are crosslinked, the crosslinking agents may be chosen from the polyolefinically unsaturated compounds commonly used for crosslinking polymers obtained by free-radical polymerization.

Examples of crosslinking agents that may be mentioned include divinylbenzene, diallyl ether, dipropylene glycol diallyl ether, polyglycol diallyl ether, triethylene glycol divinyl ether, hydroquinone diallyl ether, ethylene glycol or tetraethylene glycol di(meth)acrylate, trimethylolpropane triacrylate, methylenebisacrylamide, methylenebismethacrylamide, triallylamine, triallyl cyanurate, diallyl maleate, tetraallylethylenediamine, tetraallyloxyethane, trimethylolpropane diallyl ether, allyl (meth)acrylate, allylic ethers of alcohols of the sugar series, or other allylic or vinyl ethers of polyfunctional alcohols, and also the allylic esters of phosphoric and/or vinylphosphonic acid derivatives, or mixtures of these compounds.

According to one preferred embodiment of the present invention, the crosslinking agent is chosen from methylenebisacrylamide, allyl methacrylate and trimethylolpropane triacrylate (TMPTA). The degree of crosslinking generally ranges from 0.01 mol % to 10 mol % and more particularly from 0.2 mol % to 2 mol % relative to the polymer.

The homopolymer of monomers bearing a sulfonic group may be crosslinked with one or more crosslinking agents.

These homopolymers are generally crosslinked and neutralized, and they may be obtained according to the preparation process comprising the following steps:

(a) the monomer such as 2-acrylamido-2-methylpropanesulfonic acid in free form is dispersed or dissolved in a solution of tert-butanol or of water and tert-butanol;

(b) the monomer solution or dispersion obtained in (a) is neutralized with one or more mineral or organic bases, preferably aqueous ammonia $NH_3$, in an amount making it possible to obtain a degree of neutralization of the sulfonic acid functions of the polymer ranging from 90% to 100%;

(c) the crosslinking monomer(s) are added to the solution or dispersion obtained in (b);

(d) a standard free-radical polymerization is performed in the presence of free-radical initiators at a temperature ranging from 10 to 150° C.; the polymer precipitates in the tert-butanol-based solution or dispersion.

The preferred AMPS homopolymers are generally characterized in that they comprise, randomly distributed:

a) from 90% to 99.9% by weight of units of general formula (I) below:

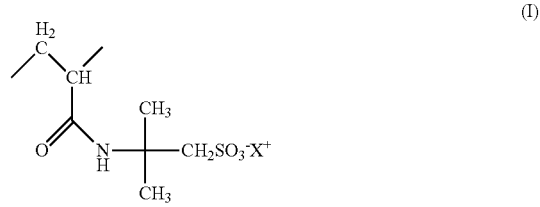

in which $X^+$ denotes a proton, an alkali metal cation, an alkaline-earth metal cation or the ammonium ion, not more than 10 mol % of the cations $X^+$ possibly being protons $H^+$;

b) from 0.01% to 10% by weight of crosslinking units derived from at least one monomer containing at least two olefinic double bonds; the weight proportions being defined relative to the total weight of the polymer.

The homopolymers according to the present invention that are more particularly preferred comprise from 98% to 99.5% by weight of units of formula (II) and from 0.2% to 2% by weight of crosslinking units.

A polymer of this type that may especially be mentioned is the crosslinked and neutralized 2-acrylamido-2-methylpropanesulfonic acid homopolymer sold by the company Clariant under the trade name Hostacerin AMPS® (CTFA name: ammonium polyacryldimethyltauramide) or Simulgel™ 800 (CTFA name: ammonium polyacryloyldimethyl taurate) sold by the company Seppic.

As other acrylic polymers comprising at least one monomer bearing a sulfonic group, mention may especially be made of acryloyldimethyltaurate polymer, preferably acryloyldimethyltaurate copolymer. Acryloyldimethyltaurate polymer is a polymer comprising acryloyldimethyltaurate as a monomer, and acryloyldimethyltaurate copolymer is a copolymer comprising acryloyldimethyltaurate as a monomer and one or more other monomers. As acryloyldimethyltaurate copolymer, mention may be made of a copolymer of acryloyldimethyltaurate, and vinylpyrrolidone (VP) such as ammonium acryloyldimethyl taurate/VP copolymer, sold under the name Aristoflex® AVC from Clariant.

2) Acrylamide/AMPS Copolymers

According to another embodiment, the hydrophilic acrylic polymer is a crosslinked anionic copolymer formed from units derived from the reaction between (i) acrylamide (monomer 1), (ii) 2-acrylamido-2-methylpropanesulfonic acid (monomer 2, referred to hereinbelow for convenience as AMPS) and (iii) at least one polyolefinically unsaturated compound (monomer 3), constituting here the crosslinking agent.

The crosslinked anionic copolymers used in the context of the present invention are products that are already known per se and their preparation has been described especially in patent application EP-A-0 503 853, the content of which is consequently included in its entirety by reference in the present description.

The above copolymers may thus be obtained conventionally according to the emulsion polymerization technique from three different co-monomers included in their constitution.

The polyolefinically unsaturated monomers used as crosslinking agents for the preparation of the copolymers in accordance with the present invention are preferably chosen from the group formed by methylenebisacrylamide, allyl sucrose and pentaerythritol. Even more preferentially, use is made of methylenebisacrylamide.

Preferably, said polyolefinically unsaturated compound is present in the copolymer in a concentration of between 0.06 and 1 mmol per mole of the monomer units as a whole.

The ratio, expressed in mol %, between acrylamide and AMPS is preferentially between 85/15 and 15/85, advantageously between 70/30 and 30/70, even more preferentially between 65/35 and 35/65 and even more particularly between 60/40 and 40/60. In addition, AMPS is generally at least partially neutralized in the form of a salt, for example with sodium hydroxide, with potassium hydroxide or with a low molecular weight amine such as triethanolamine, or mixtures thereof.

A crosslinked copolymer that is particularly preferred in the context of the implementation of the present invention corresponds to the one prepared in Example 1 of patent application EP-A-0 503 853 mentioned above, and which is then in the form of a water-in-oil inverse emulsion. More precisely, this copolymer is formed from 60 mol % of acrylamide and 40 mol % of the sodium salt of AMPS, and it is crosslinked with methylenebisacrylamide in a proportion of 0.22 mmol per mole of the total monomer mixture. The final water-in-oil inverse emulsion preferably contains about 40% by weight of crosslinked copolymer as defined above and about 4% by weight of an ethoxylated fatty alcohol with an HLB of about 12.5.

Crosslinked copolymers that are more particularly used according to the present invention are the products sold under the names Sepigel™ 305 (CTFA name: polyacrylamide/C13-14 isoparaffin/Laureth 7) or Simulgel™ 600 (CTFA name: acrylamide/sodium acryloyldimethyltaurate copolymer/isohexadecane/polysorbate 80) sold by the company SEPPIC, or Simulgel™ EG (CTFA name: sodium acrylate/sodium acryloyldimethyltaurate copolymer/isohexadecane/polysorbate 80).

3) Other Hydrophilic Acrylic Polymers

As other hydrophilic acrylic polymers that may be used according to the present invention, mention may also be made of:

homopolymers or copolymers of acrylic or methacrylic acids or salts thereof and esters thereof, such as the products sold under the names Carbopol 934, 940, 954, 981 and 980 by the company Noveon, Synthalen L® from the company 3V, sodium polymethacrylate sold under the name Darvan No. 7® by the company Vanderbilt, the products sold under the names Versicol F or Versicol K by the company Allied Colloid, Ultrahold 8 by the company Ciba Geigy and polyacrylic acids of Synthalen K type, polyacrylates and polymethacrylates such as glyceryl acrylate polymers, and in particular copolymers of glyceryl acrylate and of acrylic acid, such as the products sold under the names Lubrajel® MS, Lubrajel® CG, Lubrajel® DV, Lubrajel® NP, Lubrajel® OIL Lubrajel® Oil BG, Lubrajel® PF, Lubrajel® TW and Lubrajel® WA by the® company Guardian Laboratories. Use is preferably made of Lubrajel MS, polyacrylic acid/alkyl acrylate copolymers of Pemulen type, copolymers of acrylic acid salt/vinyl alcohol, such as the product sold under the name Hydragen FN® from Cognis, and mixtures thereof.

It may be preferable that the hydrophilic acrylic polymer be acryloyldimethyl taurate polymer, more preferably be selected from the group consisting of sodium acrylate/sodium acryloyldimethyl taurate copolymer, acrylamide/sodium acryloyldimethyltaurate copolymer, ammonium polyacryloyldimethyl taurate, ammonium acryloyldimethyl taurate/VP copolymer, and combinations thereof.

Advantageously, the composition of the present invention comprises from 0.05 wt. % to 0.8 wt. %, preferably from 0.1 wt. % to 0.5 wt. % of hydrophilic acrylic polymer, relative to the total weight of the composition.

Additional Cosmetic Active Agent(s)

Depending on the final purpose, the anhydrous composition according to the present invention can comprise an additional cosmetic active agent(s).

As additional cosmetic active agents that may be used in the anhydrous composition of the present invention, examples that may be mentioned include enzymes; flavonoids; moisturizers; anti-inflammatory agents; vitamins; depigmenting agents; α-hydroxy acids; retinoids; antibacterial active agents; tensioning agents; ceramides; essential oils; UV-screening agents (or sunscreens), and mixtures thereof; and any other active agent that is suitable for the final purpose of the anhydrous composition.

It is easy for the skilled in the art to adjust the amount of the additional cosmetic active agent based on the final use of the anhydrous composition according to the present invention.

Adjuvants or Additives

The anhydrous composition according to the present invention may also contain conventional cosmetic adjuvants or additives, for instance fragrances, preserving agents and bactericides, opacifiers, softeners, buffers, electrolytes such as sodium chloride, or a pH regulator (for example citric acid or potassium hydroxide), and mixtures thereof.

Needless to say, the skilled in the art will take care to select the optional adjuvant(s) added to the anhydrous composition according to the present invention such that the advantageous properties intrinsically associated with the anhydrous composition according to the present invention are not, or are not substantially, adversely affected by the envisaged addition.

According to a preferred embodiment, the anhydrous composition for caring for keratin materials according to the present invention comprises, relative to the total weight of the composition:

a) from 1.0 wt. % to 2.0 wt. % of ferulic acid; and b) from 91 wt. % to 98 wt. % of at least one $C_3$-$C_6$ glycol or triol, wherein dipropylene glycol presents at least 40 wt. % of the total weight of the composition; and c) from 0.2 wt. % to 6 wt. % of hydrophobic aerogel of silylated silica.

Method and Use

The anhydrous composition according to the present invention may be used for caring for keratin materials.

Thus, according to the second aspect, the present invention provides a cosmetic process for caring for keratin materials, comprising applying the anhydrous composition according to the present invention to the keratin materials.

The anhydrous composition according to the present invention can be, for example, a gel, in particular, a transparent gel.

The anhydrous composition according to the present invention can have a suitable viscosity so that the consumer can apply it on keratin materials conveniently.

Advantageously, the anhydrous composition has a viscosity ranging from 40 UD to 90 UD, preferably from 50 UD to 80 UD, more preferably from 50 UD to 75 UD, as measured with a viscometer RHEOMAT RM 180 with Mobile 3.

The viscosity is generally measured at 25° C. with a viscometer RHEOMAT RM 180 from the company Prorheo with Mobile 3 adapted to the viscosity of the composition to be tested (Mobile is chosen for having a measure between 10 and 90 for UD, Unit Deviation), the measure being made after 10 minutes rotating the mobile inside the composition at 200 rpm.

The anhydrous composition according to the present invention can be used alone, or in combination with other cosmetic composition(s).

For example, the anhydrous composition of the present invention can be used in combination with one or two other cosmetic compositions.

In one embodiment, the anhydrous composition of the present invention and one or two other cosmetic compositions are contained in a two-pump or three-pump container, all cosmetic compositions have similar viscosity so that they can be pumped out in the same amount to be applied after being mixed by the consumer.

The examples that follow are aimed at illustrating the anhydrous compositions according to the present invention, but are not in any way a limitation of the scope of the present invention.

EXAMPLES

Example 1: Preparation of Compositions

The anhydrous compositions according to invention formulas (inv.) 1-3 and comparative formula (comp.) 1 comprising the ingredients shown in the following table were prepared, with all amounts expressed by percentages by weight of active matter with regard to the total weight of each composition.

| INCI NAME | Inv. 1 Wt. % | Inv. 2 Wt. % | Inv. 3 Wt. % | Com. 1 Wt. % |
|---|---|---|---|---|
| Ferulic Acid (ORYZA FERULIX from ORYZA OIL & FAT CHEMICAL) | 1.5 | 1.5 | 1.5 | 1.5 |
| Dipropylene glycol | QS100 | QS100 | QS100 | QS100 |
| Glycerin | 29.2 | 0 | 29.2 | 29.2 |
| Ammonium polyacryloyldimethyl taurate (HOSTACERIN AMPS ® from CLARIANT) | 0.3 | 0 | 0.3 | 0.3 |
| Butylene glycol | 13.2 | 0 | 13.2 | 13.2 |
| Propylene glycol | 10.9 | 0 | 10.9 | 10.9 |
| Silica silylate(VM-2270 AEROGEL FINE PARTICLES from DOW CORNING) | 0.5 | 5.5 | 0.7 | 0 |

The anhydrous composition of comparative formula 1 does not comprises silica aerogel.

Preparation Process:

The anhydrous compositions listed above were prepared as follows, taking the composition of invention formula 1 as example:

1. Dissolving all the ferulic acid in dipropylene glycol to obtain a premix;
2. Dissolving ammonium polyacryloyldimethyl taurate in glycerin at 80° C. to obtain a glycerin solution, then adding butylene glycol, propylene glycol and the premix to the glycerin solution;
3. Decreasing the temperature to 25° C., then adding Silica silylate with stirring to obtain the composition.

If the composition does not comprise ammonium polyacryloyldimethyl taurate, for example the compositions according to invention formulas 2-3 and comparative formula 1, then the preparation of the composition can be done at room temperature.

The anhydrous compositions obtained are transparent gels.

Example 2: Evaluation of Compositions

The stability and the viscosity of each composition were evaluated as followed.

Evaluation of Stability

The stability of each composition was evaluated at 45° C., 37° C., room temperature (25° C.) and 4° C. for 8 weeks.

If there is no ferulic acid precipitating from the composition for two months, then the composition is stable.

Evaluation of Viscosity

The viscosity of each composition was determined at room temperature (25° C.) with a viscometer RHEOMAT RM 180 with Mobile 3 rotating at 200 rpm.

The stability and the viscosity of each composition were summarized in the following table.

| | | Inv. 1 | Inv. 2 | Inv. 3 | Com. 1 |
|---|---|---|---|---|---|
| stability | 45° C. | Stable | Stable | Stable | Stable |
| | 37° C. | Stable | Stable | Stable | Stable |
| | 25° C. | Stable | Stable | Stable | Stable |
| | 4° C. | Stable | Stable | Stable | Stable |
| Viscosity(UD) | | 50 | 70 | 70 | 28 |

It can be seen that the anhydrous compositions of invention formulas 1-3 can comprise high content of ferulic acid, be stable and have suitable viscosity property so that the consumers can apply them conveniently.

In addition, according to 10 volunteers, the compositions of invention formulas 1-3 can be applied to the face conveniently and resulted in a fresh and watery sensation on the face.

The invention claimed is:

1. An anhydrous composition for caring for keratin materials comprising:
    a) from 0.5 wt. % to 3.0 wt. % of ferulic acid, relative to the total weight of the composition;

b) at least one $C_3$-$C_{10}$ polyol; and
c) at least one silica aerogel,
wherein the anhydrous composition does not comprise an oil.

2. The composition according to claim 1, wherein the composition comprises from 0.8 wt. % to 2.5 wt. % of ferulic acid, relative to the total weight of the composition.

3. The composition according to claim 1, wherein the polyol is selected from the group consisting of $C_3$-$C_6$ glycols and triols.

4. The composition according to claim 1, wherein the polyol is selected from the group consisting of propylene glycol, butylene glycol, pentylene glycol, hexylene glycol, dipropylene glycol and glycerin.

5. The composition according to claim 1, wherein the composition comprises from 90 wt. % to 99 wt. % of at least one $C_3$-$C_{10}$ polyol, relative to the total weight of the composition.

6. The composition according to claim 1, wherein the composition comprises at least 40 wt. % of dipropylene glycol, relative to the total weight of the composition.

7. The composition according to claim 1, wherein the aerogel is hydrophobic silica aerogel.

8. The composition according to claim 1, wherein the composition comprises from 0.1 wt. % to 8.0 wt. % of silica aerogel, relative to the total weight of the composition.

9. The composition according to claim 1, further comprising at least one hydrophilic thickener.

10. The composition according to claim 1 comprising, relative to the total weight of the composition:
a) from 1.0 wt. % to 2.0 wt. % of ferulic acid; and
b) from 91 wt. % to 98 wt. % of at least one $C_3$-$C_6$ glycol or triol and
c) from 0.2 wt. % to 0.8 wt. % of hydrophobic aerogel of silylated silica.

11. The composition according to claim 1, having a viscosity ranging from 40 UD to 90 UD as measured with a viscometer RHEOMAT RM 180 with Mobile 3.

12. A cosmetic process for caring for keratin materials, comprising applying the anhydrous composition according to claim 1 to the keratin materials.

13. The composition according to claim 7, wherein the aerogel is silylated silica.

14. The composition according to claim 10, wherein dipropylene glycol presents at least 40 wt. % of the total weight of the composition.

* * * * *